Nov. 4, 1924.  
C. J. DU BRUL  
CIGAR MOLD  
Filed Dec. 29, 1920

1,514,142

Inventor  
C. J. DuBrul,

By  
Knight Bros  
Attorneys

Patented Nov. 4, 1924.

1,514,142

UNITED STATES PATENT OFFICE.

CLARENCE J. DU BRUL, OF CINCINNATI, OHIO.

CIGAR MOLD.

Application filed December 29, 1920. Serial No. 433,874.

*To all whom it may concern:*

Be it known that I, CLARENCE J. DU BRUL, a citizen of the United States, and a resident of the city of Cincinnati, in the county of Hamilton and State of Ohio, have invented certain new and useful Improvements in Cigar Molds, of which the following is a specification.

My invention relates to cigar molds and more particularly to the type of mold formed in two parts, and comprising a block or base carrying the cavities in which the cigars are placed and a lid supporting the cups. In molds of this character, it is essential that some sort of centering means be provided whereby the lid will always be properly aligned with the base or block.

In order to provide for this alignment, it is customary to form on the lid and block dowel-pins and cooperating apertures, to receive the dowel-pins when the lid is placed in position upon the block. It is likewise essential in this type of aligning means that the dowel-pins intimately engage the walls of the apertures throughout most of the diameter of the apertures and with as little play as possible in order that the exact alignment of the lid and block be maintained.

It is customary in removing the lid from the block to insert clamps or fingers between the lid and block at one end thereof and to thereby pry the lid from the base to dissemble the two parts. It is essential that the lid be raised so that the caps move out of the cavities in a plane substantially parallel to the sides of the caps in order that the parts may not bind and become bent or broken. Therefore, in dissembling the block and lid it has been found advantageous to pry the lid at one end thereof to incline it longitudinally or to insert clamps at one of the longitudinal sides of the mold thereby inclining the lid transversely.

Many forms of dowel-pins and apertures have been provided which would provide the necessary alignment and which would also permit a longitudinal inclination of the lid while removing the same from the base. None of the constructions, however, enable the lid to be either transversely or longitudinally inclined inasmuch as such an inclination of the lid would cause a binding between the dowel-pin and its corresponding aperture.

Therefore it is the particular object of my invention to provide a dowel-pin and aperture therefor, which will permit the lid to be inclined either longitudinally or transversely with respect to the base in the operation of dissembling the mold.

Figure 1:
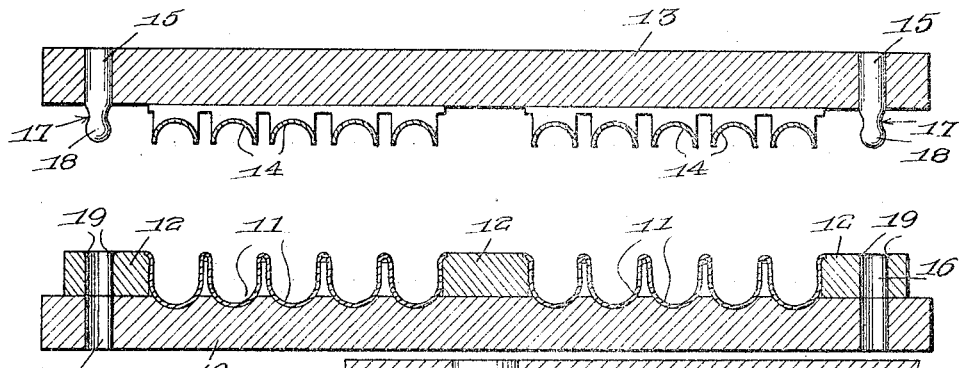
Figure 2:
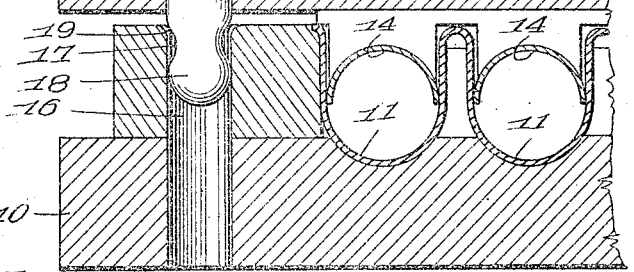
Figure 3:
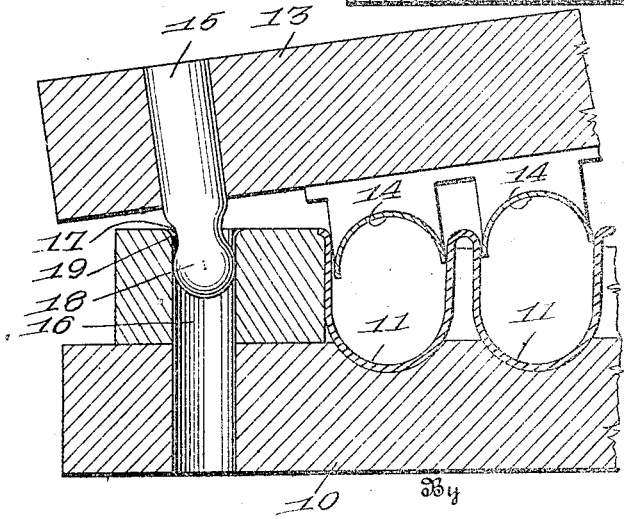

The invention will be more particularly described and illustrated in the accompanying specification and drawings in which:

Figure 1 is a longitudinal section of a cigar mold with the parts about to be assembled, and embodying my invention, Figure 2 is an enlarged sectional view of one end of the mold in assembled position, and Figure 3 is a similar view with the parts partly dissembled.

The reference numeral 10 designates the base or block of the mold provided with cavities 11, designed to receive the cigar bunches. In the mold illustrated, the base is also provided with transverse ribs 12.

The top or lid 13 of the mold is provided with a series of cups 14 which cooperate with the cavities 11 in the well-known manner.

In order to prevent relative movement between the two parts of the mold and to properly align these two parts, I provide dowel-pins 15 and cooperating apertures 16. In the drawings I have illustrated the dowel-pins as carried by the lid of the mold and the base as provided with the apertures but it is obvious that the position of the dowel-pins and apertures may be reversed without in any manner affecting the advantages derived from this invention.

The dowel-pins are reduced and rounded as indicated at 17 and formed with a ball-shaped or rounded end 18. The end of the aperture 16 adjacent the dowel-pins 15 is also slightly rounded as at 19.

The diameter of the ball-shaped end 18 of the dowel-pin is of sufficient diameter to engage the wall of the aperture 16, without an appreciable amount of play.

Therefore, when the two parts of the mold are brought together to the position illustrated in Figure 2, with the pins 15 engaging the apertures 16, the two sections of the mold will be properly aligned and relative movement between the two prevented.

When the lid is to be removed from the block, the clamps are applied as usual to the lid to impart an inclination thereto to assist in the dissembling. In Figure 3, the lid is illustrated in a longitudinal inclined position and it is apparent that during the incline the reduced curved portion 17 of the dowel-pin rides on the rounded edge 19 of the aperture, while the ball-shaped end 18 revolves within the aperture. The same relative movement between the pin and aperture will take place should the lid be inclined transversely of this longitudinal length and at no time during the dissembling of the mold will the pin bind in its aperture.

It is obvious therefore that in dissembling the mold sections the lid may be caused to assume an angular inclination with respect to the base if desired, thereby facilitating the removal of the lid without mutilating or breaking the cups and cavities of the mold sections. The dowel-pins and apertures form what is in the nature of a ball and socket connection, thereby providing for a sufficient degree of angular movement of the lid.

While I have illustrated my invention as applied to one particular type of cigar mold, it is obvious that it may be applied equally and as advantageously with any type of cigar mold embodying two registering sections.

While I have illustrated the ends of the pins 15 as being spherically shaped, it should be understood that my invention is not limited to this precise form. For instance, instead of spherical, they may be more blunt, the edge of the blunt surface, however, being rounded.

It is likewise obvious that the dowel-pins may be positioned on the base and the lid provided with the apertures, and also that this construction can be used where more than one dowel-pin is provided at each end, for the purpose of eliminating the possibility of getting the lid reversed.

It is likewise obvious that the pin described can have the reduced portions on the sides only, in order to obtain the transverse inclination and the longitudinal inclination can be obtained by the relieving of one side of the aperture as is the common practice. This can be done without destroying the effectiveness of the pin as a guide.

Having thus described my invention, what I claim is:

1. A cigar mold which comprises two sections, dowel-pins carried by one section, the other section thereof being provided with cooperating apertures, said dowel-pins being provided with reduced neck portions adjacent their ends, the wall of the aperture adjacent the dowel-pins being rounded for cooperation therewith.

2. A cigar mold formed of two sections, one of said sections being provided with apertures, dowel-pins carried by the other section, said dowel-pins having their operative ends substantially ball-shaped, the wall of the apertures adjacent the dowel-pins being rounded, as and for the purpose set forth.

3. A cigar mold formed of two sections, one of said sections being provided with apertures, dowel-pins carried by the other section, said dowel-pins having a reduced rounded portion adjacent a substantially ball-shaped end, as and for the purpose set forth.

4. A cigar mold formed of two sections, one of said sections being provided with apertures, dowel-pins carried by the other section, said dowel-pins each being provided with a rounded reduced neck portion adjacent its end, as and for the purpose set forth.

5. A cigar mold formed of two sections, one of said sections being provided with apertures, dowel-pins carried by the other section, said dowel-pins being provided with reduced neck portions, the wall of the apertures adjacent the neck of the dowel-pins being rounded, as and for the purpose set forth.

6. A cigar mold formed of two sections, one of said sections being formed with apertures, dowel-pins carried by the other section, said dowel-pins being provided with an annular reduced rounded neck adjacent a substantially spherical end.

7. A cigar mold formed of two sections, one of said sections having formed therein apertures, dowel-pins carried by the other section, said dowel-pins each being formed with an annular reduced rounded neck portion and a substantially ball-shaped end, the wall of each aperture adjacent the dowel-pins being rounded to cooperate therewith.

CLARENCE J. DU BRUL.